Patented Sept. 4, 1951

2,566,302

UNITED STATES PATENT OFFICE 2,566,302

COPOLYMERS OF CINNAMOYL-VINYL AROMATIC HYDROCARBONS

Charles F. H. Allen and James A. Van Allan, Rochester, N. Y., assignors to Eastman Kodak Company, Rochester, N. Y., a corporation of New Jersey No Drawing. Application August 28, 1947,
Serial No. 771,142

4 Claims. (Cl. 260—66)

1

This invention relates to photography and the production of synthetic resins and in particular to a light-sensitive resin of use as a photomechanical resist.

In the past a wide variety of light-sensitive colloid compositions have been utilized as resists in the photomechanical art, wherein it is desired to expose and under the influence of light harden the colloid in the region of exposure, following which the unhardened colloid is removed from the unexposed region of the support, such as a metal plate, which is then etched in the latter region with acid and the like. In a process of the type described in Murray U. S. Patent 1,965,710, granted July 10, 1934, removal of the unexposed resin is accomplished using an organic solvent. However, on occasion it is found difficult to remove the unexposed colloid in the presence of the exposed colloid because the latter may not be completely insoluble, especially in regions corresponding to the shadows of the original photographic subject. Consequently, this solvent development must be critically controlled to prevent washing away the whole colloid resist. Other compositions of the prior art, for example, those containing albumin or gelatin and dichromate, are not stable and therefore distinctly lack the properties of the optimum material.

We have discovered a new type resins useful for a variety of purposes which in photographic use are devoid of most of the defects of the mentioned materials and which can be developed to give clear-cut resists and furthermore have such good stability that coatings of the same may be stored for long periods of time similar to photographic film or paper.

One object of our invention is to provide a class of resins and particularly light-sensitive resins of use in the photographic art. Another object is to provide a method and materials used in making the new resins claimed as our invention. Other objects may be apparent from reading the following description of our invention.

The photographic use of these resins is described and claimed in copending Yule U. S. patent application Serial Number 771,087 filed concurrently herewith.

The light sensitive resins of our invention apparently owe their light-sensitive and hardening properties to the presence in the resin molecule of the R—CH=CH—CO— grouping. For the desired solubility characteristics we use the hereinafter described copolymer resin chains in conjunction with the light-sensitive group. Resins

2 of the type contemplated by our invention are those having the following general formula:

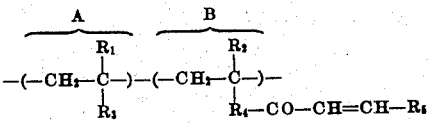

wherein $R_1$ and $R_2$ are hydrogen or a lower alkyl group of 1 to 4 carbon atoms, $R_3$ is an aryl, acyl, nitrile, carboxyalkyl or ether group, $R_4$ is an aryl group, and $R_5$ is hydrogen, aryl or an alykl group, for example, of 1 to 6 carbon atoms. The ratio of unit A to unit B is chosen principally to control the solubility of the resin either to facilitate the coating of the resin or its selective removal with solvents after exposure under an image in photographic processes. That is, we have found that the resin

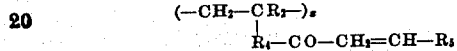

for example, resulting from the reaction of polystryrene with cinnamoyl chloride is too insoluble to be of use in the photographic process. If, however, a ratio of reactants is selected such that the unreacted styrene groups predominate in the molecule, satisfactory solubility ensues.

The resins of our invention may be made in several ways: (1) We prefer to take a polymerized body like polystyrene and react in solvent medium with an acid chloride containing the light-sensitive grouping in the presence of aluminum chloride or (2) we may react the acid chloride with the monomeric aryl compound and either simultaneously or (3) at a later time causing the monomer carrying the light-sensitive group to be polymerized. These reactions are believed to be productive of a resinous polymer of compound (A) represented by the following general formula:

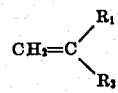

wherein $R_1$ is of the group consisting of hydrogen and lower alkyl groups of from 1 to 4 carbon atoms, $R_3$ is of the group consisting of aryl, acyl, nitrile, carboxyalkyl and alkyl ether groups, and a compound (B) represented by the following general formula:

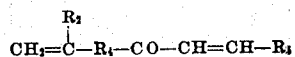

wherein $R_2$ is of the group consisting of hydrogen and lower alkyl groups of from 1 to 4 carbon atoms, $R_4$ is aryl, $R_5$ is of the group consisting of hydrogen, aryl, and alkyl groups of, for example, from 1 to 6 or more carbon atoms.

It is to be understood that hereinafter and in the appended claims where the resins of the invention are thus described, this includes resins prepared by methods (1), (2) or (3) above to be described in more detail in the following description. In the above formulae $R_1$ is hydrogen or an alkyl group of 1 to 4 carbon atoms e. g. methyl, ethyl, propyl or butyl; $R_2$ is hydrogen or an alkyl group of 1 to 4 carbon atoms; $R_3$ is aryl including for example phenyl or phenyl substituted with p-ethyl, p-chloro, o-hydroxy or 2,4-dimethyl groups; when $R_3$ is acyl it may for example be acetyl or chloroacetyl; when $R_3$ is carboxyalkyl the alkyl group may be e. g. butyl, methyl or ethyl and when $R_3$ is alkyl ether the alkyl group may for example be methyl, ethyl, propyl or butyl. $R_4$ may be aryl including, for example, o-hydroxy or o-methoxyphenyl, phenyl or naphthyl groups; $R_5$ is hydrogen, aryl such as phenyl, or alkyl of the order of 1 to 6 carbon atoms, as methyl; however, numerous other alkyl groups may be selected. The manufacture of the corresponding $R-CH=CHCOCl$ compound is effected by well known methods of organic synthesis such as the Perkin condensation reaction using an aldehyde of the required number of carbon atoms.

The following examples are given as detailed methods of making resins or polymers typical of those contemplated by our invention by means of method (1) mentioned.

*Example I.*—Twenty-six parts of polystyrene was dissolved in 260 parts of carbon disulfide and 7 parts of cinnamoyl chloride in 60 parts of carbon disulfide well mixed and cooled with water. Then 11.5 parts of aluminum chloride was added in small portions and stirring was continued for one hour. The mixture was gently heated on the steam bath—a vigorous evolution of HCl followed and the mixture set to a jelly-like solid after 10 to 15 minutes. Heating was continued for 20 minutes. The excess carbon disulfide was decanted and the jelly was steamed very thoroughly. It was dried at 50° overnight. The yield of crisp, almost white, solid was 26 parts.

The polymer thus produced has a ratio of substantially 6 mols of styrene (compound A of the above formulae) to one mol of cinnamoyl styrene (compound B) in the resin chain molecule.

*Example II.*—A mixture of 26 parts of polystyrene in 260 parts of carbon disulfide and 2.3 parts of cinnamoyl chloride in 60 parts of carbon disulfide was cooled and while stirring 3.4 parts of anhydrous aluminum chloride was added in small portions. After the addition had been completed stirring was continued for one hour. The reaction mixture was then allowed to stand overnight, then warmed on the steam bath for 30 minutes. The product was decomposed with ice and hydrochloric acid, and the solvent steamed out, over a period of 2 hours. The white friable residue amounted to 33 parts.

The resin obtained in this manner contained styrene and cinnamoyl styrene groups in the molecular ratio of substantially 18 to 1, respectively.

In a similar manner the amount of acid chloride may be varied in the above examples to obtain practically any ratio of the two components (A) and (B) in the molecule. We find that the physical, solubility and photographic properties of the resins vary with composition as shown in the following Table I. The solubility of the specific resin of Example II is given in Table II.

*Table I*

| Resin Class | Mols (A) | Mols (B) | Properties |
|---|---|---|---|
| I | 50 or more | 1 | Good solubility, low sensitivity to light. |
| II | 18–50 | 1 | Good solubility, medium sensitivity to light. |
| III | 5–18 | 1 | Good solubility and sensitivity to light. |
| IV | 1 | 1 | Limited solubility and good sensitivity to light. |
| V | 1 | 1–50 | Limited solubility and good sensitivity to light. |
| VI | 1 | More than 50 | Very poor solubility and good sensitivity to light. |

*Table II*

| Soluble in | Limited Solubility in |
|---|---|
| Chlorobenzene [1] | t-Butanol. |
| Xylene [1] | Ethylene glycol. |
| Decalin [1] | Turpentine. |
| n-Butanol | Lactic acid. |
| iso-Butanol | iso-Propanol. |
| Aniline | Formamide. |
| Tetralin | |
| Amyl acetate | |
| Ethanol | |
| Methyl salicylate | |

[1] Especially good solvents for photographic purposes.

As may be seen from Table I, resins of classes II and III exhibit definite common characteristics making them most suitable for coating and photographic applications. Class I, IV and V resins are of most use in operations where either very good solubility or sensitivity are not major requirements and class VI resins are most useful in applications not requiring good solvent solubility such as in molding or casting operations or in those instances where after reaction with the acid chloride a more or less insoluble formed product is desired and is obtained according to reaction methods (1), (2) or (3) above-mentioned.

*Example III.*—According to method (3) the acid chloride is reacted with the monomeric compound to produce the resin component (B) as follows. Suitable amounts of the monomeric compound are treated with the acid chloride, if desired in an inert solvent medium such as carbon disulfide, and after reaction the product is caused to polymerize with the same or a different monomer not containing the ketone grouping. For this purpose catalysts such as peroxides or naphthalenesulfonates may be used.

*Example IV.*—In the manner of Example III and method (2) the monomer is reacted with the acid chloride, in suitable solvent if desired, in the presence of a different or an excess of the same monomer whereby polymerization occurs at substantially the same time as the ketone group is added to the aryl group.

In Example I or II we may use, for example, in various amounts, in place of polystyrene; alpha-methyl styrene, o-hydroxystyrene, o-methoxystyrene, or vinylnaphthalene; and in place of cinnamyl chloride or its nuclear substituted derivatives, cotonyl or acrylyl chloride or other acid chloride where $R_5$ is an alkyl group of 1 to 6 or more carbon atoms. Similarly, the polymer reacted with the acid chloride can be a copolymer of vinylbenzenes or naphthalenes and, for example, p-ethyl, p-chloro, o-hydroxy, or 2,4-dimethyl styrenes, vinyl cyanide, vinyl acetate or chloro acetate, methyl methacrylate, methyl, ethyl, propyl, or butyl acrylates, vinyl methyl, vinyl ethyl, vinyl propyl, or vinyl butyl ketones.

According to method (3) and Example III and method (2) and Example IV the monomer forming compound (B) of the formulae may be one of the above-mentioned aryl vinyl compounds (styrenes or vinyl naphthalenes) and the monomer forming compound (A) may be one of the above aryl vinyl compounds, or vinyl acetates, acrylates, nitriles, or ketones. Similarly, the acid chloride may be one of those mentioned.

The molecular weight of the materials obtained by the methods of the examples above may be varied in the conventional manner by selection of original polymers of the desired molecular weight such as 40,000 or 50,000 for polystyrene or by selection of the amount or type of catalyst or varying the time or conditions of polymerization with for example heat and/or ultraviolet light.

Generally the higher molecular weight resins have better solubility in the aromatic solvents.

It is to be understood that the disclosure herein is by way of example and that we consider as included in our invention all modifications and equivalents falling within the scope of the appended claims.

What we claim is:

1. A resinous polymer of a compound (A) represented by the following general formula:

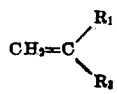

wherein $R_1$ is of the group consisting of hydrogen and lower alkyl groups of from 1 to 4 carbon atoms, $R_3$ is of the group consisting of aryl, acyl, nitrile, carboxyalkyl and alkyl ether groups, and a compound (B) represented by the following general formula:

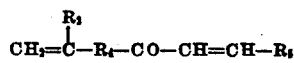

wherein $R_2$ is of the group consisting of hydrogen and lower alkyl groups of from 1 to 4 carbon atoms, $R_4$ and $R_5$ are aryl groups, the molecular ratio of compound (A) to compound (B) in the polymer being from 5:1 to 18:1.

2. A resinous polymer of a compound (A) represented by the following general formula:

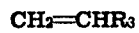

and a compound (B) represented by the following general formula:

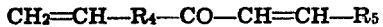

wherein $R_3$, $R_4$ and $R_5$ are aryl groups, the molecular ratio of compound (A) to compound (B) in the polymer being from 5:1 to 18:1.

3. A resinous polymer of a compound (A) represented by the following general formula:

and a compound (B) represented by the following general formula:

wherein $R_3$, $R_4$ and $R_5$ are benzene groups, the molecular ratio of compound (A) to compound (B) in the polymer being from 5:1 to 18:1.

4. A resinous polymer of a compound (A) represented by the following general formula:

and a compound (B) represented by the following general formula:

wherein $R_3$, $R_4$ and $R_5$ are benzene groups, the molecular ratio of compound (A) to compound (B) in the polymer being substantially 18:1.

CHARLES F. H. ALLEN.
JAMES A. VAN ALLAN.

REFERENCES CITED

The following references are of record in the file of this patent:

UNITED STATES PATENTS

| Number | Name | Date |
|---|---|---|
| 2,105,792 | Nelles | Jan. 18, 1938 |
| 2,197,709 | Ralston | Apr. 16, 1940 |
| 2,415,796 | Lichty | Feb. 11, 1947 |
| 2,425,269 | Seymour | Aug. 5, 1947 |

FOREIGN PATENTS

| Number | Country | Date |
|---|---|---|
| 97,663 | Austria | Aug. 25, 1924 |

OTHER REFERENCES

Stobbe et al.: J. Prakt. Chemie, (N. F.) 123, pages 1–60, especially pages 9–13, (1929).